(12) United States Patent
Beach

(10) Patent No.: X4266
(45) Date of Patent: Nov. 16, 1825

(54) STEAM ENGINE, CIRCULATING

(76) Inventor: Timothy Beach

Timothy Beach.

Letters Patent.

The Schedule referred to in these Letters Patent and making part of the same containing a descrip-
tion in the words of the said Timothy Beach himself of his improvement, being an Elementary
circulating Steam Engine.

This machine is for the purpose of forcing up a column of water
by steam, which water in its descent gives motion to a wheel or any other body to be connected to
any machinery requiring this motion to be continued. and is produced in the following manner
viz a boiler is to be constructed at any convenient height to be filled and fed by a pump
connected with the boiler. and which may be worked by levers connected to the main shaft.
or otherwise. at one end of the boiler is a trial cock to ascertain the proper height of the water.
on the opposite end are inserted as many horizontal tubes as may be thought proper, which
tubes at a small distance from the boiler have a stop cock. which may be worked by the
machine so constructed as to let on the steam to one tube while it cuts it off from the
other. and in the like manner for as many tubes as may be used. These tubes descend
through a cistern of water, and as they rise again at the opposite end have two valves so
constructed as to open one inwards to receive the water of the cistern. the other upwards to cut
off the communication when necessary and permit the water to ascend the tube. The tubes
continue to rise until of the height required and then bend over in such a manner as to dis-
charge the water driven through them into a cistern which water is to be let fall upon
the wheel or other body to be set in motion. From this cistern a small pipe conducts
water to the pump to feed the boiler. The operation of the machine is carried on in the
following manner viz. The Steam when generated in the boiler is passed through the
stop cock into the tubes. when it descends towards the valves. it is [illegible] by a body
of water drawn through the valve opening inwards, and which water is driven immediately up-
wards through a valve, also under the water in the — — — — — continuing — —
— — — of the — — — — — the cistern to be poured upon the body — —
wheel to be set in motion. What I claim as my particular invention and for which
I solicit a patent is the application of Steam in the manner above described to raising
a column of water which in its descent is to give motion to machinery.

Witnesses
Wm Elliot
C. David

Timothy Beach

Expd.
W.E.

DRAFTSMAN'S DIVISION.

*All communications should be addressed to*
"The Commissioner of Patents, Washington, D. C."

2—328 a.

*DEPARTMENT OF THE INTERIOR,*

United States Patent Office,

*Washington, D. C.,* ............, *189*...

*SIR:*

*The printed* copies *of Patent No.* P Beach Nov. 16, 1825 are *exhausted.*

*As soon as printed a copy will be mailed you to complete your order.*

*By direction of the Commissioner:*

*Very respectfully,*

*Chief Clerk.*

8143b6-97-5m